(12) United States Patent
Chung

(10) Patent No.: US 8,317,140 B1
(45) Date of Patent: Nov. 27, 2012

(54) TRIPOD

(76) Inventor: Kiosky Chung, Taichung (TW)

( * ) Notice: Subject to any disclaimer, the term of this patent is extended or adjusted under 35 U.S.C. 154(b) by 0 days.

(21) Appl. No.: 13/297,224

(22) Filed: Nov. 15, 2011

(51) Int. Cl.
*F16M 11/00* (2006.01)

(52) U.S. Cl. .................. 248/163.1; 248/164; 248/431

(58) Field of Classification Search ............... 248/163.1, 248/164, 431, 432, 440
See application file for complete search history.

(56) References Cited

U.S. PATENT DOCUMENTS

| 32,698 | A | * | 7/1861 | Johnson | 108/118 |
| 115,598 | A | * | 6/1871 | Free | 108/118 |
| 587,391 | A | * | 8/1897 | Gandy | 297/18 |
| 1,477,233 | A | * | 12/1923 | Alexander | 108/14 |
| 1,561,371 | A | * | 11/1925 | Strupe | 248/150 |
| 1,940,565 | A | * | 12/1933 | Schott | 108/159 |
| 2,710,733 | A | * | 6/1955 | Phillips | 248/431 |
| 4,934,638 | A | * | 6/1990 | Davis | 248/164 |
| 5,876,091 | A | * | 3/1999 | Chernomashentsev | 297/16.2 |

* cited by examiner

*Primary Examiner* — Anita M King

(57) ABSTRACT

A tripod includes three legs and a connecting apparatus. The connecting apparatus includes three screws and three nuts. Each of the screws is inserted through a related one of the legs before it is engaged with a related one of the nuts to connect the legs to one another. The legs can be retained in an opened position for use by the connecting apparatus.

8 Claims, 5 Drawing Sheets

US 8,317,140 B1

TRIPOD

BACKGROUND OF INVENTION

1. Field of Invention

The present invention relates to a supporting apparatus and, more particularly, to a reliable tripod.

2. Related Prior Art

As disclosed in U.S. Pat. No. 5,876,091, a collapsible tripod stool 16 includes three legs 18 and a structure 20 for connecting the legs 18 to one another. Each of the legs 18 includes a bent flat upper end 26 and a flattened curved lower end 38 (the "feet 38"). The bent flat upper end 26 of each of the legs 18 is connected to a flexible seat 22. A user can sit on the flexible seat 22 when the legs 18 are opened and the feet 38 are located on the ground or a floor. The structure 20 includes a Y-shaped element 40 and three U-shaped elements 44. The Y-shaped element 40 includes three prongs. Each of the U-shaped elements 44 is pivotally connected to a related one of the prongs of the Y-shaped element 40. Each of the legs 18 includes an upper section 34 inserted through an opening defined by a related one of the prongs of the Y-shaped element 40 and a related one of the U-shaped elements 44. As the U-shaped elements 44 are moved to the feet 38 along the legs 18, the legs 18 are closed. The U-shaped elements 44 are however freely movable along the legs 18, it is hence difficult to control the extent to which the legs 18 are opened and the height in which the flexible 22 is located.

As disclosed in Taiwanese Patent Publication No. 552916, a barbecue grill includes a tripod that includes three legs 10, a Y-shaped element 20 and a ferrule 30. The Y-shaped element 20 includes three prongs each inserted through a related one of the legs 10. The ferrule 30 is supposed to confine the legs 10, opened or closed. The ferrule 30 is stressed considerably as the legs 10 are opened. After some time of use, the ferrule 30 is inevitably slackened. Now, as the legs 10 are closed, the ferrule 30 falls onto lower ends of the legs 10 because of gravity so that upper ends 11 of the legs 10 are opened and that at least some of the prongs of the Y-shaped element 20 could be disengaged from the legs 10.

The present invention is therefore intended to obviate or at least alleviate the problems encountered in prior art.

SUMMARY OF INVENTION

It is the primary objective of the present invention to provide a reliable tripod.

To achieve the foregoing objective, the tripod includes three legs and a connecting apparatus. The connecting apparatus includes three screws and three nuts. Each of the screws is inserted through a related one of the legs before it is engaged with a related one of the nuts to connect the legs to one another. The legs can be retained in an opened position for use by the connecting apparatus.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
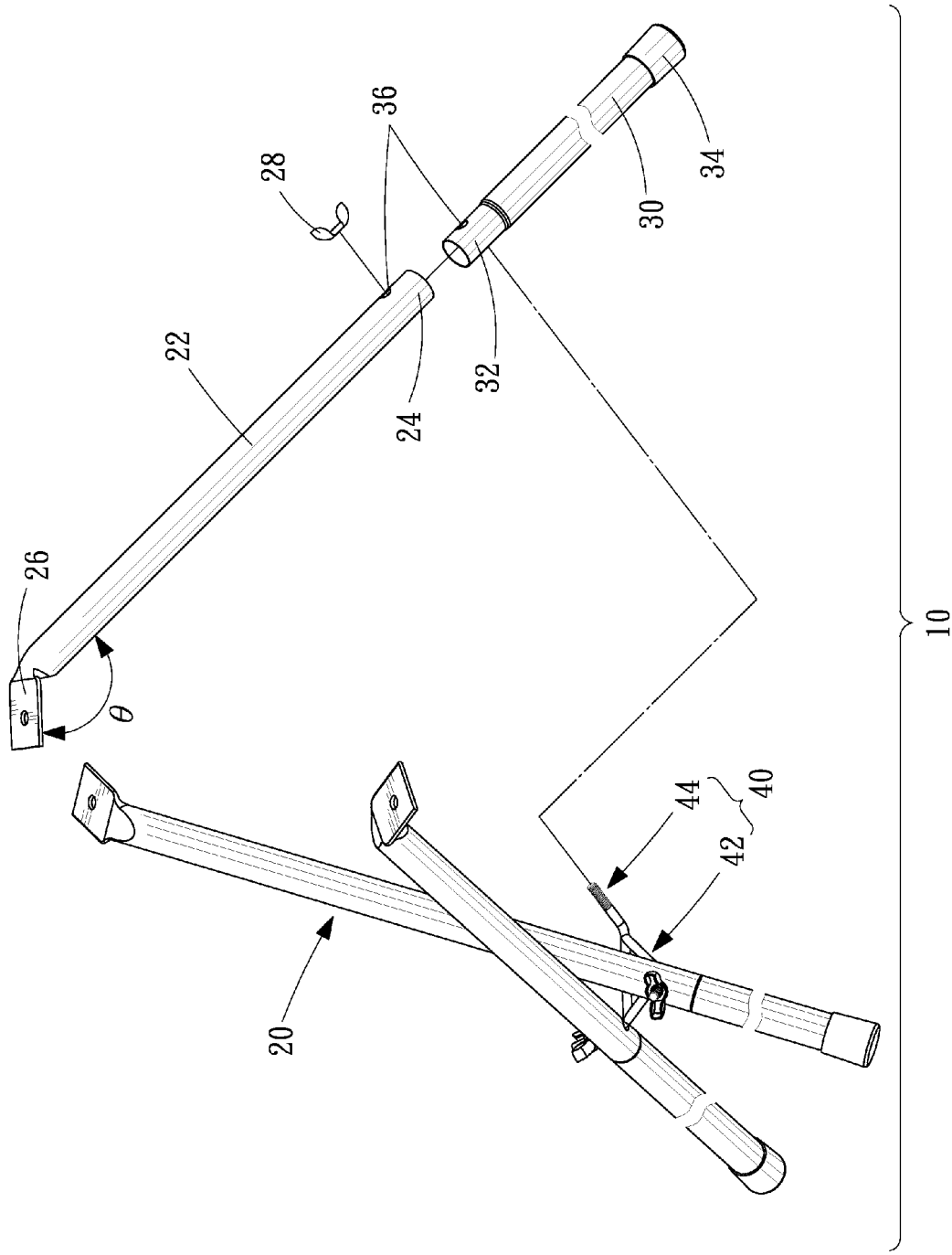
FIG. 1 is an exploded view of a tripod according to the first embodiment of the present invention.
Figure 2:
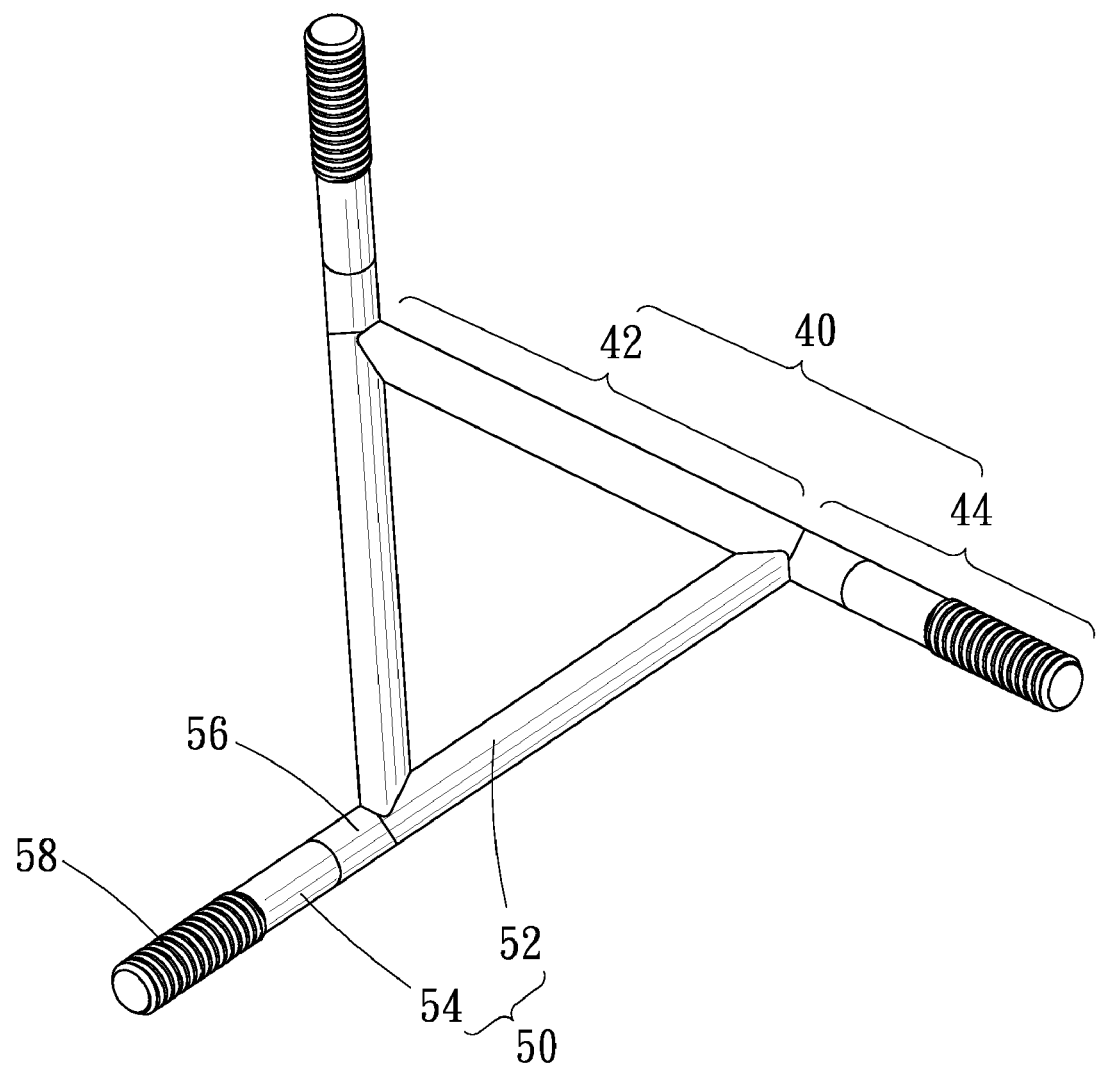
FIG. 2 is top view of the tripod shown in FIG. 1.
Figure 3:
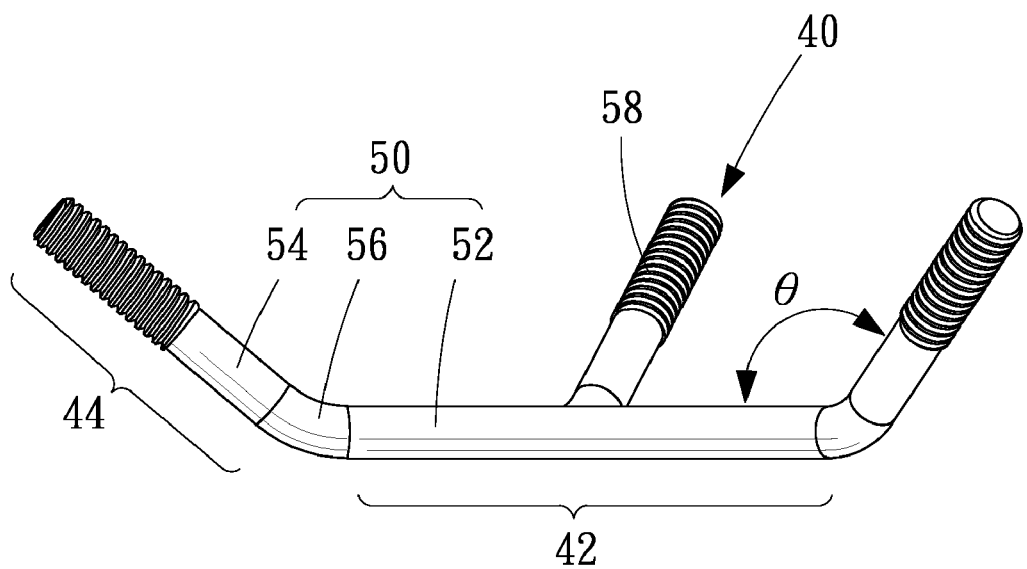
FIG. 3 is a side view of the tripod shown in FIG. 1.

Referring to FIGS. 1 to 3, there is shown a tripod 10 according to a first embodiment of the present invention. The tripod 10 includes three legs 20 and a connecting apparatus 40 for connecting the legs 20 to one another. Each of the legs 20 includes a first tube 22 and a second tube 30.

The first tube 22 includes a tubular lower end 24 and a flat upper end 26. The flat upper end 26 of the first tube 22 is bent so that there is an angle θ between the midline of the flat upper end 26 of the first tube 22 and the axis of the remaining portion of the first tube 22. Two apertures 36 are defined in the tubular lower end 24 of the first tube 22 transversely.

The second tube 30 includes a reduced upper end 32 and a lower end. The lower end of the second tube 30 is fit in a cup 34 made of an elastic material such as rubber and plastics. Two apertures 36 are defined in the reduced upper end 32 transversely.

The connecting apparatus 40 includes three rods 50. Each of the rods 50 includes a bent section 56 extending between a first straight section 52 and a second straight section 54 so that there is an angle θ defined between the first straight section 52 and the second straight section 54. The tip of the first straight section 52 of each of the rods 50 is connected to the first straight section 52 of an adjacent one of the rods 50 near the bent section 56. Thus, the first straight sections 52 of the rods 50 together form a triangular base 42 of the connecting apparatus 40. A thread 58 is formed on the second straight section 54 of each of the rods 50. Thus, the bent section 56 and the second straight section 54 of each of the rods 50 together form a screw 44 extending from a related corner of the triangular base 42.

In assembly, for each of the legs 20, the reduced upper end 32 of the second rod 30 is inserted in the tubular lower end 24 of the first rod 22. A related one of the screws 44 is inserted through the apertures 36 before it is engaged with a butterfly nut 28. Thus, the legs 20 are connected to one another. The legs 20 can be opened and closed.

Figure 4:
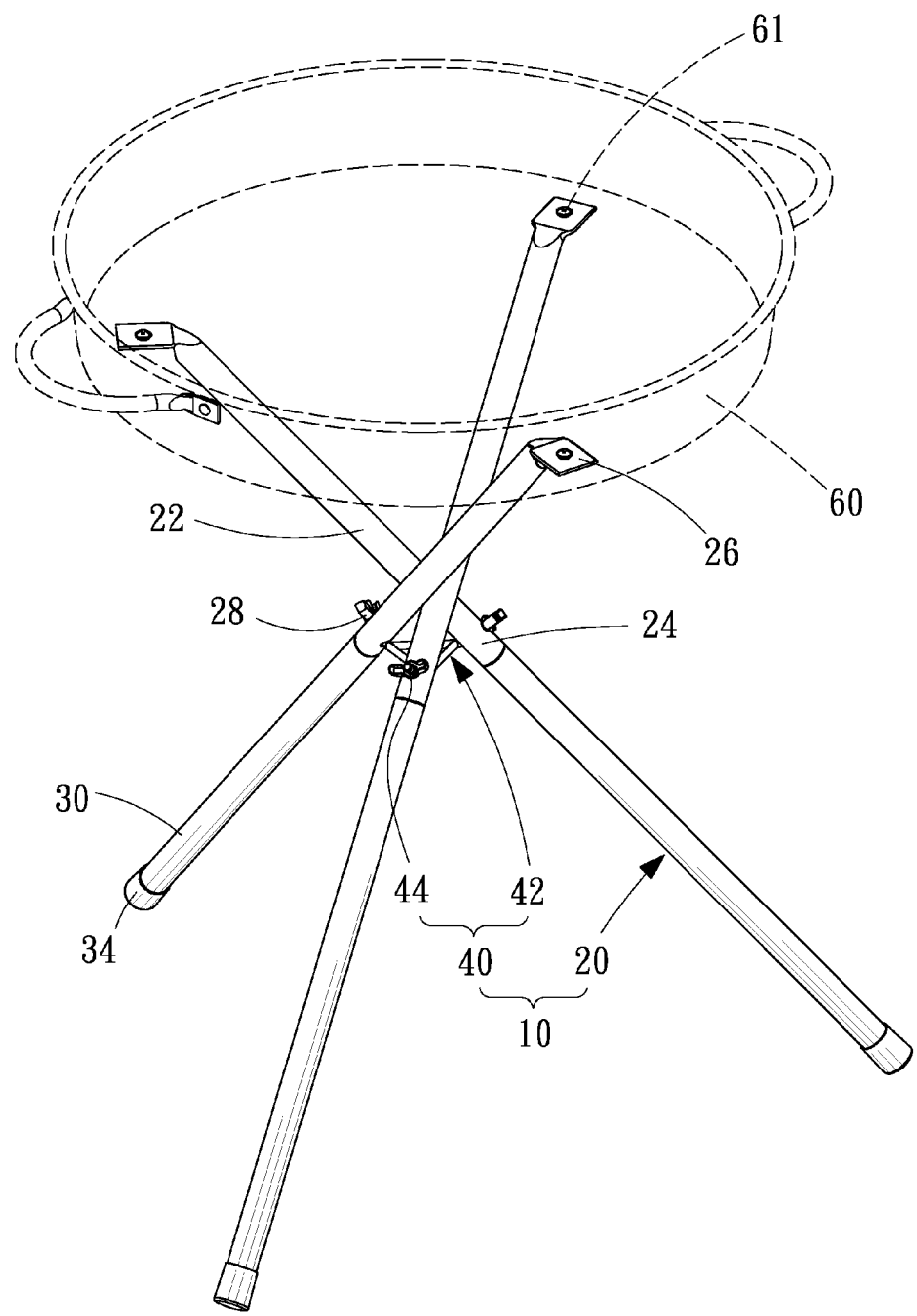
FIG. 4 is a perspective view of a pan on the tripod shown in FIG. 1.

Referring to FIG. 4, a pan 60 is supported on the tripod 10. The flat upper end 26 of the first tube 22 of each of the legs 20 is secured to the pan 60 by a fastener 61 such as a screw or rivet. The legs 20 are opened when the pan 60 is in use. The screws 44 extend upward from the triangular base 42. It should be noted that the connecting apparatus 40 is located lower than a position where the legs 20 are in contact with one another.

Figure 5:
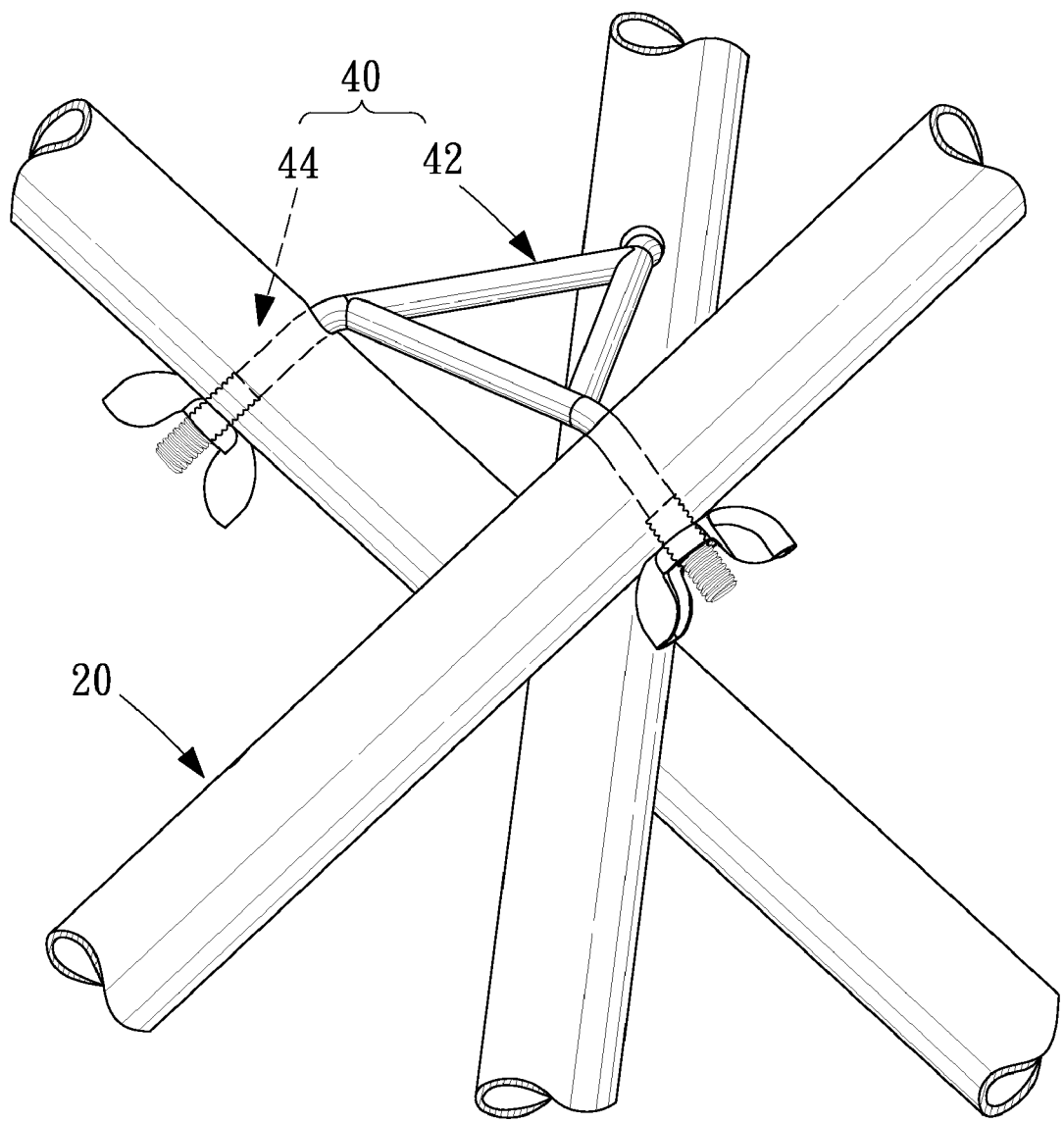
FIG. 5 is a perspective view of a pan supported on a tripod according to the second embodiment of the present invention.

Referring to FIG. 5, there is shown a tripod according to a second embodiment of the present invention. The second embodiment is identical to the first embodiment except that the connecting apparatus 40 is located in an inverted position. Hence, the screws 44 extend downward from the triangular base 42 and the connecting apparatus 40 is located lower than the position where the legs 20 are in contact with one another.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A tripod including:
   three legs; and a connecting apparatus including a triangular base, three screws each extending from a respective corner of the triangular base through a related one of the legs and three nuts each engaged with a related one of the screws to connect the legs to one another, wherein the legs can be retained in an opened position for use by the connecting apparatus.

2. The tripod according to claim 1, wherein the connecting apparatus includes three rods each including:

a first straight section;

a second straight section;

a thread extending on the second straight section so that the second straight section and the thread form one of the screws; and a bent section extending between the first and second straight sections, wherein the first straight section includes a tip connected to a point of another one of the rods between the first straight section and the bent section so that the first straight sections of the rods together form the triangular base.

3. The tripod according to claim 1, wherein each of the legs includes a bent flat upper end.

4. The tripod according to claim 1, including three caps each fit around a lower end of a related one of the legs.

5. The tripod according to claim 1, wherein each of the legs includes a first tube and a second tube connected to the first tube.

6. The tripod according to claim 5, wherein the first tube includes a tubular lower end, wherein the second tube includes a reduced upper end inserted in the tubular lower end of the first tube.

7. The tripod according to claim 1, wherein the connecting apparatus is located higher than a position where the legs are in contact with one another in the opened position.

8. The tripod according to claim 1, wherein the connecting apparatus is located lower than a position where the legs are in contact with one another in the opened position.

\* \* \* \* \*